United States Patent Office 2,766,575
Patented Oct. 16, 1956

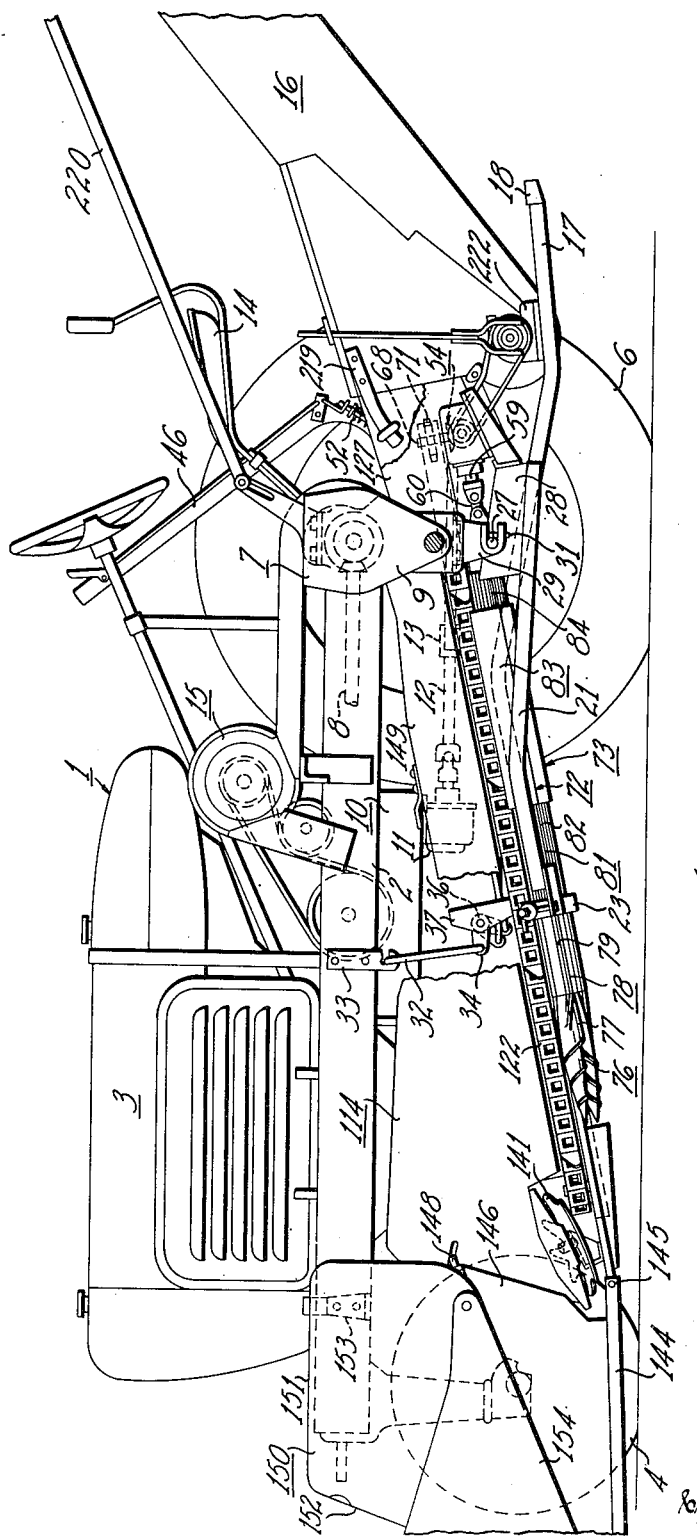

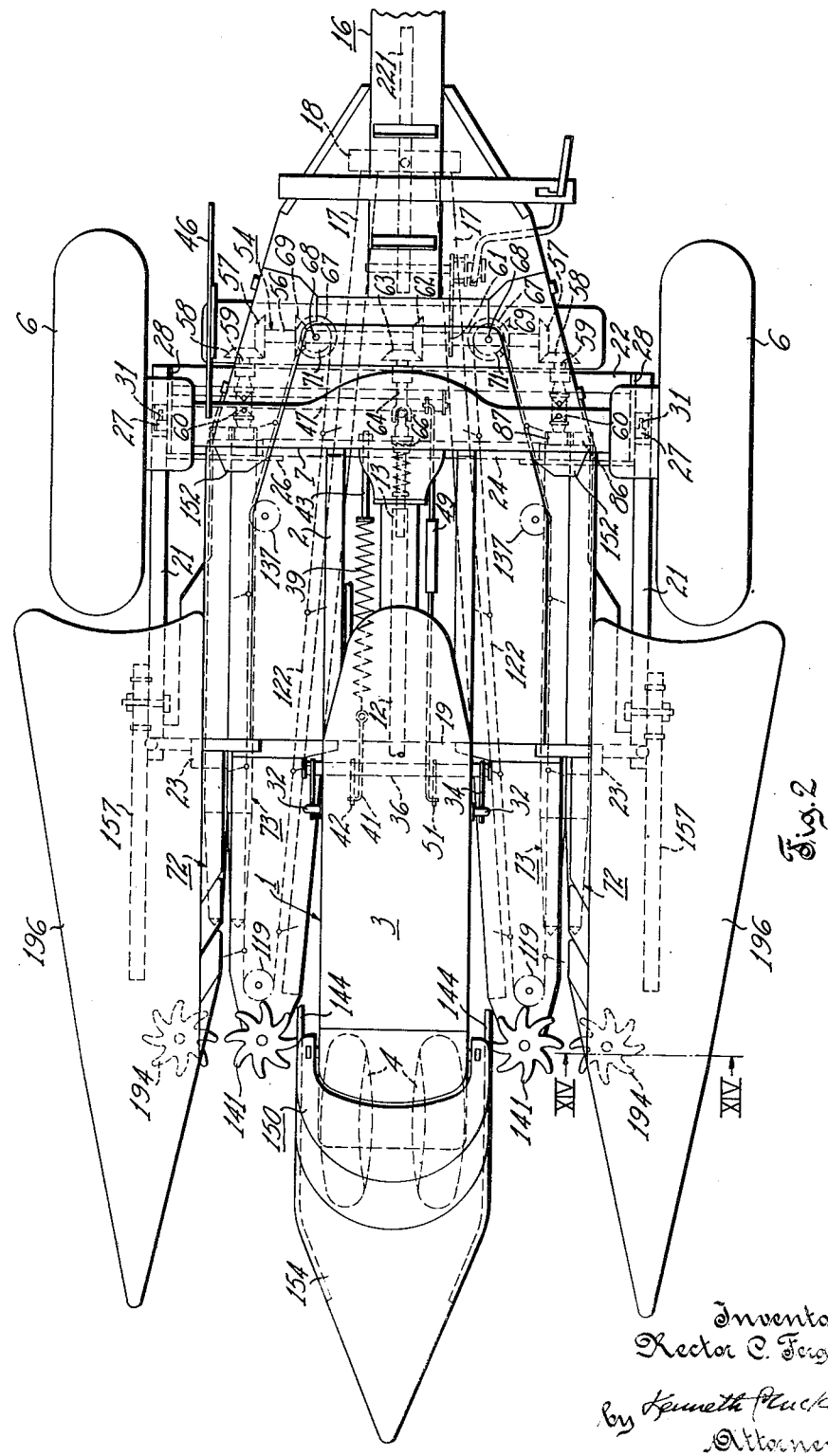

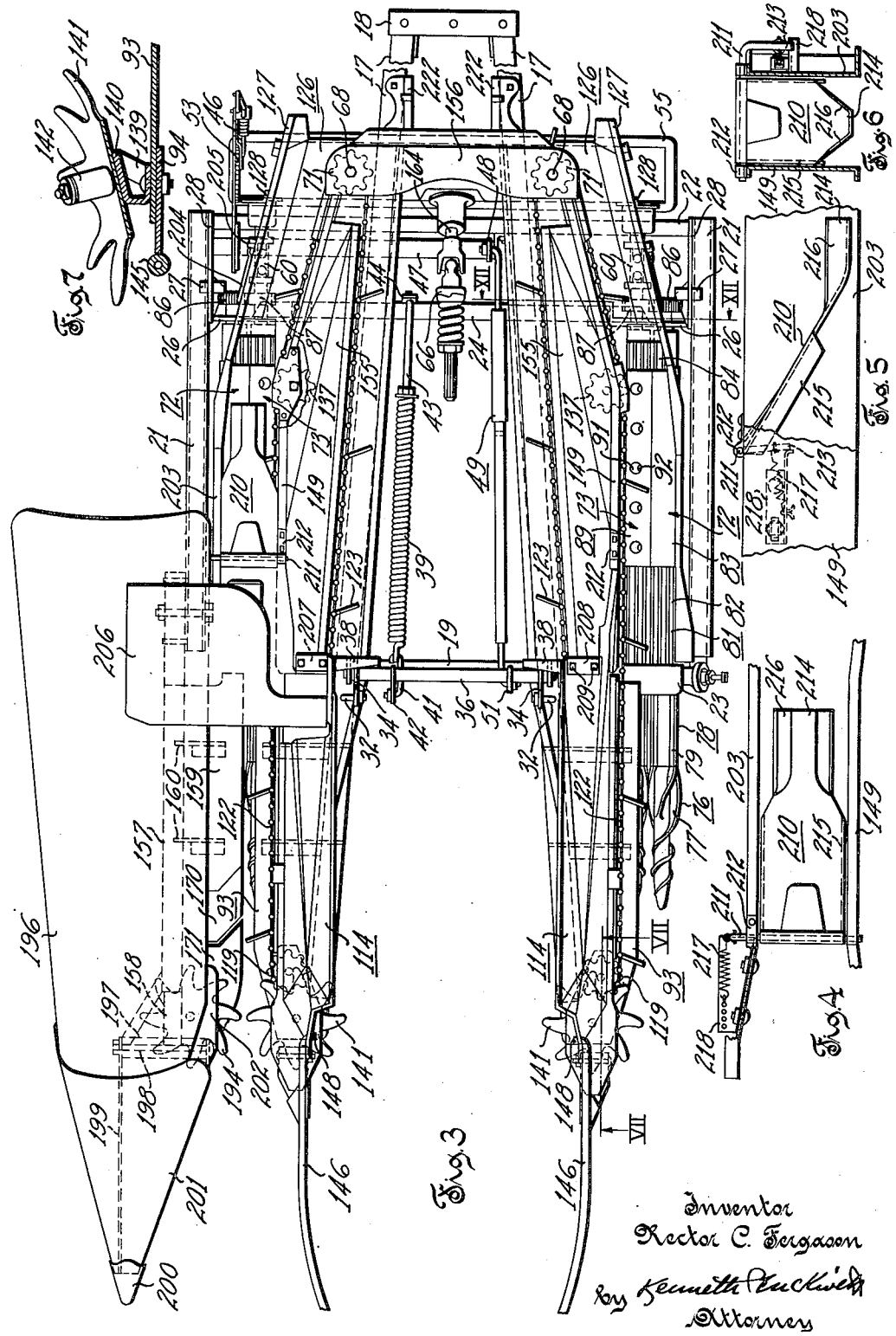

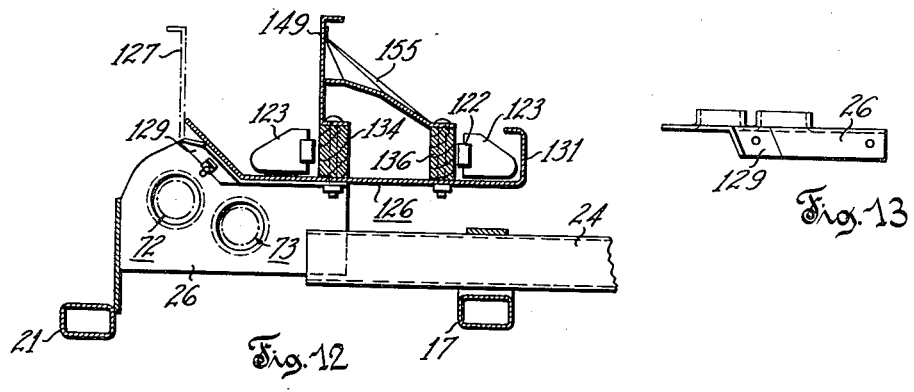
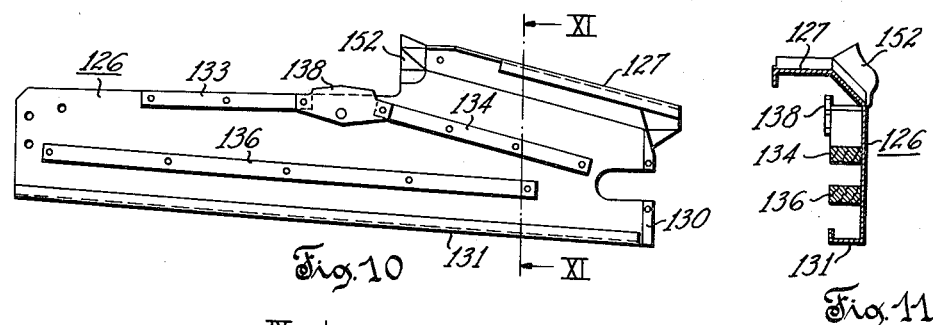
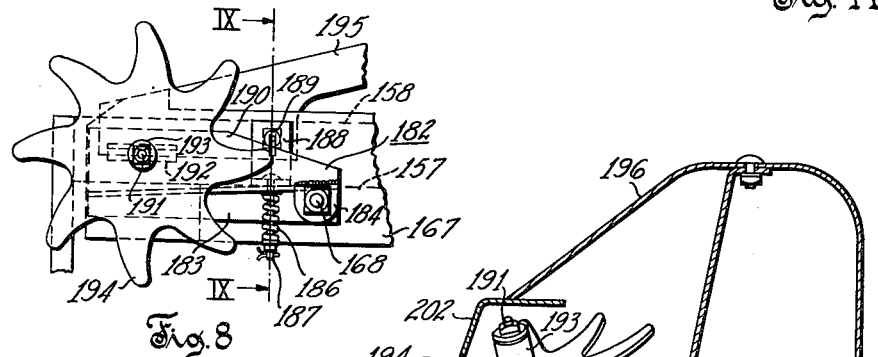
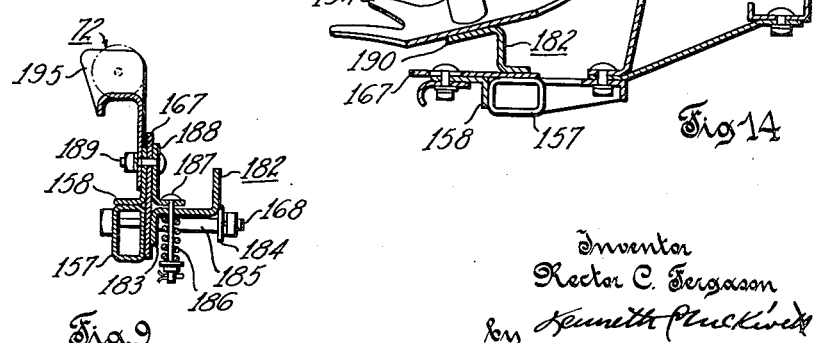

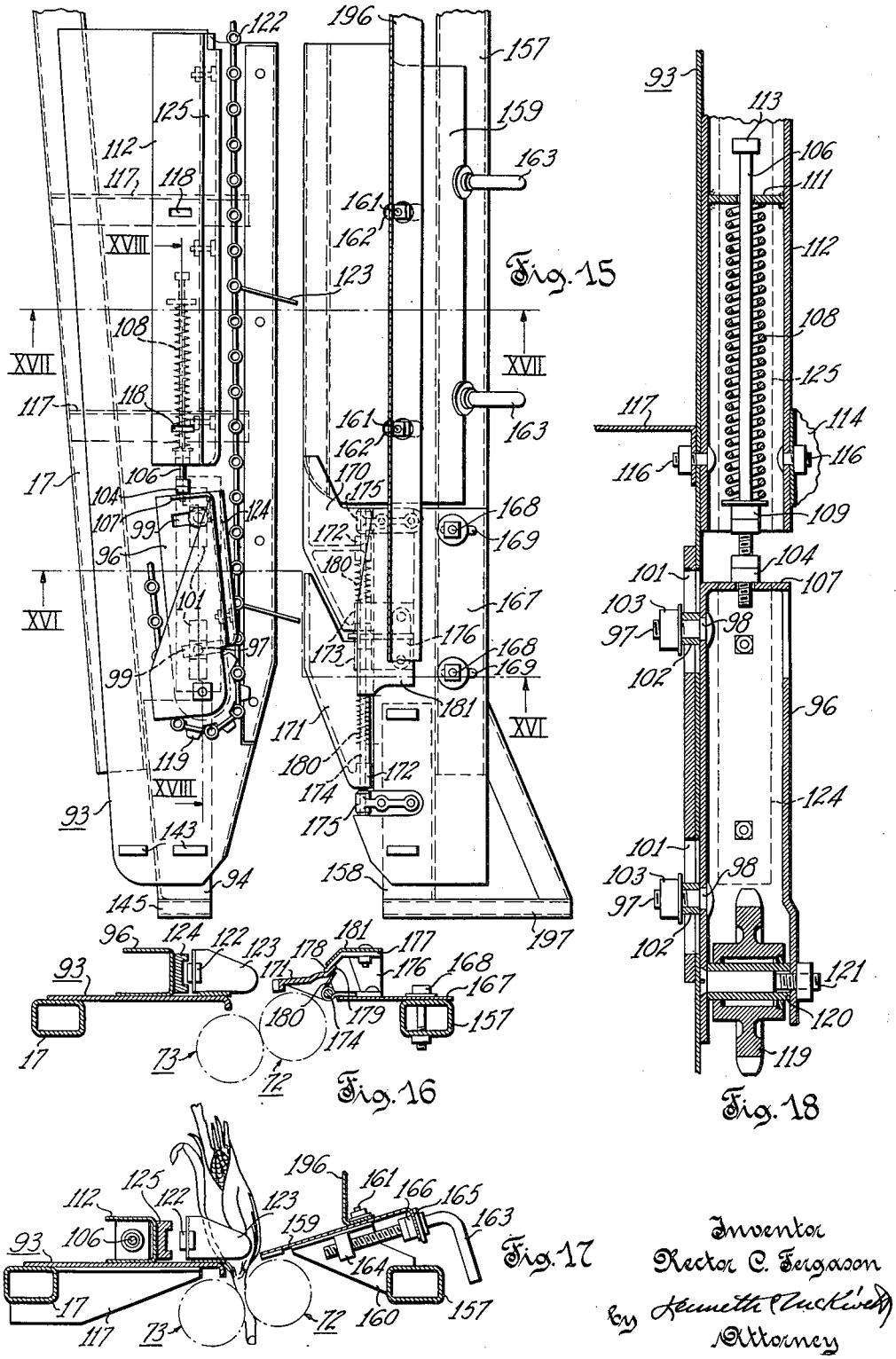

2,766,575

GATHERING AND CONVEYING MEANS FOR CORN HARVESTER

Rector C. Fergason, Gadsden, Ala., assignor to Allis-Chalmers Manufacturing Company, Milwaukee, Wis.

Division of application Serial No. 447,025, June 15, 1942. Continuation of application Serial No. 111,057, August 18, 1949, now Patent No. 2,663,983, dated December 29, 1953. This application May 4, 1953, Serial No. 352,795

5 Claims. (Cl. 56—109)

This application is a division of my copending application Serial No. 447,025, filed June 15, 1942, now abandoned, and of the continuation thereof, application Serial No. 111,057, filed August 18, 1949, now U. S. Patent 2,663,983, issued December 29, 1953, and the invention relates in general to agricultural implements, and has more particular relation to corn harvesters wherein during their travel through the field, ears of corn are picked from standing stalks and the husks are preferably removed from the picked ears and the latter are conveyed to a suitable point of collection.

The present invention is directed toward and contemplates avoiding or minimizing disadvantages of many present commercial forms of farm implements, and the production of a corn harvester of such simple design and construction, reduced number of parts and light weight, as results in reduced initial cost to the farmer and reduced costs of operation, and embody features which provide for efficient operation and increased comfort and safety of the operator of the machine.

Additional advantages of the present invention are concerned with the provision of a conveyor mechanism of improved design and utilizing a single movable conveying element effectively disposed with respect to the harvesting rolls, for gathering the corn stalks into picking relation with respect to the rolls, and conveying picked corn over the husking rolls, and conveying husked corn to a point of collection at the rear of the tractor.

A further advantage of this invention is concerned with the provision of cooperative husking rolls of improved design wherein provisions are made for effectively presenting the picked corn to yieldable husking points carried by one of the husking rolls for facilitating removal of the husks; and an additional advantage is concerned with the provision of an improved device for yieldingly pressing picked ears onto the husking roll without interference with the movable conveying element.

Further advantages of this invention are concerned with the provision of devices of improved design and construction for guiding the standing corn stalks into effective snapping relation with respect to the rolls, and for lifting down stalks and ears into position where they are effectively carried into desired operative relation with respect to said rolls.

Further advantages of this invention are concerned with the provision of devices of improved design and construction and association with the harvester rolls for preventing passage of ears of corn into a position where they may be injured by the snapping rolls.

Other objects of this invention are concerned with provision of a corn harvester of such improved design and construction as contribute to the attainment of the aforesaid and other structural and operating advantages, individually and collectively.

These and other objects and advantages are attained by the present invention, various novel features of which will be apparent from the description herein and the accompanying drawings, disclosing an embodiment of features of the invention, and will be more particularly pointed out in the annexed claims.

In the accompanying drawings:

Fig. 1 is a view in side elevation, with parts removed to facilitate illustration, showing a tractor mounted corn harvester embodying features of the present invention;

Fig. 2 is a plan view of the harvester, with parts removed, in its relation to the tractor;

Fig. 3 is a plan view of the harvester, with parts removed;

Figs. 4, 5, 6 are plan, side elevation and rear elevation views, respectively, of a detail shown in Fig. 3;

Fig. 7 is an enlarged sectional view, with parts removed, in the plane of the line VII—VII of Fig. 3;

Fig. 8 is an enlarged plan view of a detail shown in Fig. 3;

Fig. 9 is a sectional view in the plane of the line IX—IX of Fig. 8;

Fig. 10 is an enlarged plan view of an element shown in Figs. 2 and 3;

Fig. 11 is a sectional view in the plane of line XI—XI of Fig. 10;

Fig. 12 is a sectional view, with parts removed, in the plane of line XII—XII of Fig. 3;

Fig. 13 is a plan view of a detail shown in Fig. 12;

Fig. 14 is an enlarged sectional view in the plane of line XIV—XIV of Fig. 2;

Fig. 15 is a plan view with parts removed, of the forward end of a portion of the harvester;

Figs. 16 and 17 are sectional views in the planes of the lines XVI—XVI and XVII—XVII, respectively, of Fig. 15 with the rolls shown in broken lines; and Fig. 18 is an enlarged sectional view in the plane of line XVIII—XVIII of Fig. 15.

In the embodiment of the invention illustrated in the drawing, a conventional form of tractor 1, or other suitable form of mobile frame, includes a supporting frame 2 carrying an engine 3, with conventional control and other accessories. The tractor frame is supported on a pair of steerable front wheels 4 having their axles suitably hung from the frame, and on a pair of traction wheels 6 carried by a rear axle housing 7 supported on or integral with the rear portion of the tractor frame. This rear axle housing is preferably of the drop type wherein the central or intermediate portion encloses a differential drive, driven from the usual transmission shaft 8, and depending side portions 9 of the housing enclose gear connections from the differential drive to the axles of the traction wheels 6. A conventional change-speed transmission 10 provides a variable speed connection from the engine shaft to the transmission shaft; and a power take-off connection 11, preferably associated with the transmission 10, serves to drive a power take-off shaft 12 having an internally splined sleeve 13 at its rear end for furnishing power to the various parts of an implement that may be associated with the tractor. An operator's seat 14 is suitably supported on the engine frame or rear axle housing in desired position with respect to the tractor controls. A fan 15 may be mounted on and suitably driven from the tractor engine, for furnishing an air blast to remove loose trash from the tractor and implement parts.

The corn harvester is shown as comprising two units which are similar except as to being left and right, respectively, and each comprising cooperative picking and husking rolls mounted on a supporting frame and disposed at its own side of the tractor frame and with its essential harvesting parts disposed laterally within the tread of the adjacent traction wheels 6, and a conveying device extending rearwardly for conveying husked corn beneath the tractor rear axle housing and depositing it in the forward lower end of an elevating conveyer 16 at the rear of the tractor, along with suitable controls and drives for operating the several mechanisms of the harvester.

The harvester frame (see Fig. 3) comprises two longitudinally extending forwardly diverging inner frame bars 17 at opposite sides, respectively, of the center line of the harvester, the forward portions of the frame bars being generally straight and inclined in a rearward and upward direction, and rear portions of the frame bars 17 being downwardly inclined with respect to the forward portions. These bars 17 are connected in spaced relation through a cross bar 18 at their rear end, with their rear portion occupying a position substantially below the intermediate portion of the rear axle housing; and a cross bar 19 rigidly connected to the bars 17 at a forward point. Longitudinally extending frame bars 21 preferably of rectangular tubular form, are disposed laterally outside of the bars 17 but at points within the tread of the adjacent traction wheels 6 (see Fig. 2), and their forward portions are in substantially the same horizontal plane as the bars 17 but with their rear ends generally inclined downwardly at a slightly different rate of inclination than the bars 17. The bars 21 are secured in desired assembled relation with respect to the bars 17 by a cross bar 22 connected, directly or through connecting brackets, to rear ends of the bars 21 and to the bars 17. The bars 21 are also connected to the adjacent longitudinal frame bars 17 through brackets (not shown) rigidly connected to the bars 17 and bearing supports 23 detachably connected to the brackets and to the forward end portion or an extension thereof, of the corresponding bars 21. A cross bar 24 is also rigidly connected, through connecting brackets, to the longitudinal bars 17, and upstanding bracket members 26 serve to connect the lateral extensions of the cross bar 24 to the bars 21. These bracket members 26 serve as supports for the rear bearings of the harvester rolls, to be referred to hereinafter (see Fig. 12).

The harvester frame is pivotally mounted on the tractor through horizontally aligned pivot pins 27 carried by the frame, preferably mounted on bracket plates 28 mounted on the rear portions of the frame bars 21, with the pivot element extending through and outward from the plate and welded thereto and braced thereon. The pins 27 are received in bearing recesses of bracket bearing members 29 (see Fig. 1) which are open at their rear ends, the bearing pins being held in operative position in their bearing brackets 29 by removable locking pins 31. The bearing brackets are each mounted in position through a hanger portion secured, preferably in a removable manner, by one or more screw bolts to an underneath part of the depending side portions 9 of the rear axle housing 7. The laterally projecting pivot pins 27 are in such position with respect to the other portions of the harvester frame that the tractor may be propelled rearwardly over the harvester frame and parts carried thereby when the frame is supported on the ground, with its rear end at a suitable elevation, until the rear end of bearing brackets 29 pass over and receive the pivot pins therein.

The forward end of the harvester frame is hung from the tractor at an adjustable height above the ground through a pair of hanger rods 32 removably suspended from brackets 33 attached to each side of the tractor frame. The lower end of each of the hangers 32 is removably attached to an arm 34 mounted on a sleeve 36 which is rotatably mounted on journals carried by brackets 37 mounted on the forward side of upstanding bracket plates 38 (see Fig. 3) indirectly attached and in spaced relation to the frame parts 17 and 19. A counterbalancing spring 39 of the tension type, attached at its forward end, through a bail or rod 41, to an arm 42 on the rotatable sleeve 36, and connected at its rear end through a rod 43 adjustably connected to the cross bar 24 or preferably a bracket 44, as indicated in Fig. 3, thereon, exerts a biasing turning movement on the rotatable sleeve 36, to thereby exert a lifting effect on the harvester frame through the hanger rods 32, thus partially counterbalancing the weight of the forward part of the harvester to any desired extent, determined by the initial tension placed on the spring through the adjustable connection at the rear end of the rod 43 to the cross bar 24 or bracket thereon.

The forward portion of the harvester frame may be raised or lowered, against the biasing effect of the spring 39, by an actuating lever 46 having a handle portion within reach of the tractor operator and with its lower end secured to a bracket on a sleeve 47 which is rotatable on journals mounted on brackets carried by the rear end of the adjacent frame member 21 and by the cross bar 22. The sleeve 47 has an arm 48 to which the rear end of a yielding operating connection 49 is attached, the forward end of this operating connection being attached to an arm 51 on the rotatable sleeve 36. The operating lever 46 is held in desired position by a conventional form of latch 52 (see Fig. 1) carried by the lever and engaging in an appropriate notch of a quadrant 53 (see Fig. 3) suitably mounted on a rear portion of the harvester frame, or the drive housing thereof, referred to hereinafter.

An enclosing housing 55 (see Fig. 2) of a power transmitting drive is removably mounted on a pair of spaced brackets preferably detachably secured to and extending rearwardly from the cross bar 22 of the harvester frame. A cross shaft 56 is journaled and enclosed in housing 55 and has bevel gears 57 attached to the ends thereof. The gears 57 mesh with bevel gears 58 carried by the rear ends of forwardly extending shafts 59 mounted in bearings carried by the gear housing 55. A flexible coupling 60, preferably in the form of a double universal coupling, has its rear end attached to shaft 59 and is provided with a forward end which may be attached to the rear end of a shaft for operating harvesting rolls, referred to hereinafter.

Shaft 56 has a sprocket wheel 61 attached to a mid-portion thereof. A bevel gear 62 attached to shaft 56, meshes with a bevel gear 63 on the inner end of shaft section 64 extending forwardly with a slight upward inclination and mounted within a bearing carried by the housing 55. The forward end of this shaft is provided with a universal coupling and overload clutch mechanism 66 which is adapted at its forward end to be received within splined sleeve 13 of power take-off shaft 12. A bevel gear 67 is secured to the lower end of each shaft 68 within housing 55 and in driven relation to bevel gears 69 secured to shaft 56. Attached to the upper end of shaft 68 indirectly through an overload clutch mechanism (not shown) is a sprocket 71.

With the parts of the power transmission drive 54 in assembled relation, and the shaft 64 connected to the power take-off shaft 12 of the tractor engine, the shaft 56 is driven through bevel gears 62, 63. The shaft 56, acting through bevel gears 57, 58, drives the forwardly extending shafts 59 and the parts associated therewith, and, through bevel gear connections 67, 69 drive the upwardly extending shafts 68 and the parts associated therewith.

Each picker husker unit, shown more particularly in Fig. 3, comprises a pair of oppositely rotatable cooperative rolls, the outer roll being indicated generally at 72 and the inner roll at 73. These rolls are rotatably supported in operative position through journal portions on the roll shafts at their rear ends in bearings carried in bearing supporting plate 26 (see Fig. 12), and at an intermediate point in bearings mounted in bearing support 23 adjacent the forward end of the longitudinal bars 21. The axis of the outer roll is substantially higher than the axis of the inner roll as is indicated in Fig. 1.

The outer roll 72 is built up of sections rigidly secured to a central longitudinally extending shaft (not shown). The forward or snapping element of the roll includes a relatively pointed forward end section 76 (see Fig. 3) extending forwardly from adjacent bearing housing 23 and being of decreasing and disappearing taper toward the rear end thereof. This forward portion of the snapping section is provided with external spiral ribs 77 of gradually increasing pitch toward the rear end. A rear portion 78 of the snapping section is secured on the shaft immediately adjacent the forward portion 76, the exterior of this portion 78 being provided with equally spaced external longitudinal ribs 79, preferably four in number, extending to a point adjacent bearing housing 23. The angular position of the portions 77 and 79 on the shaft is such that the rear ends of ribs 77 are in longitudinal alignment with the longitudinal ribs 79.

Rearwardly of and spaced from the roll portion 78 is a trash section 81 secured to the shaft and provided with longitudinal ribs 82, preferably of considerably greater number than the ribs 79, and extending from the forward end of the section to a point adjacent the rear end of the section.

The husking roll section 83 of the roll 72 is positioned rearwardly adjacent trash section 81 and is in the form of a cylindrical tube of rubber or the like providing a resiliently yielding and generally smooth husking surface secured to the shaft by conventional means. A trash section 84 is attached to the shaft of roll 72 rearwardly adjacent husking roll section 83 and is provided with longitudinal ribs similar to forward trash section 81. Adjacent the rear end of trash section 84, roll 72 is journaled in a bearing carried by supporting plate 26 (see Fig. 12). A spur gear 86 is rigidly secured in position on the rear end of roll 72 in such a manner with respect to the bearing support that the roll shaft is held in definite position against appreciable longitudinal movement relative to the bearing support. The gear 86 is in driven relation with the spur gear 87 on the shaft of the harvester roll 73.

The harvester roll 73 is also of sectional construction and is mounted on its shaft with the forward snapping or picking section 76, 78 of the same design and construction as the corresponding section 76, 78 of the roll 72. The trash roll section 81 is similar to the corresponding trash roll section of the roll 72. The husking roll section 89 of the roll 73 is in the form of a cylindrical relatively smooth metal tube secured on the roll rearwardly adjacent to the rearward end of the forward trash section. Roll section 89 is provided with longitudinal rows of diametrically aligned apertures 91 for receiving yielding husking pegs or elements 92 preferably of spring steel which normally project from the apertures. The manner of mounting these husking pegs forms no part of this invention and the details of such mounting are not herein included. If such details are desired, same can be found in the parent application previously mentioned. It being sufficient to here mention that the husking points 92 project to a position where they bite into husks of the ears passing over the rolls and tear the husks and draw them downwardly into the space between the oppositely rotating rolls, the latter seizing the husks and drawing them through the rolls, the ears remaining on the upper side of the rolls. As the husking points 92 come into engagement with husking roll section 83, the points are yieldingly forced back into apertures 91. The forward bearing support 23 carries the roll bearings for the rolls 72 and 73 and supports these bearings in a flexible manner so that the rolls can spread apart at the forward end when handling corn stalks of a large size.

The several sections of the rolls are assembled on their shafts in such a manner that the ribs 77 on one of the roll sections 76 will be substantially in line with corresponding ribs on the other of such roll sections as they pass a point between the rolls, and the longitudinal ribs on each of the trash roll sections 81, 84 will be out of alignment with the corresponding ribs on the other of such trash roll sections as they rotate past a point at the opposed side of the rolls.

Each pair of rolls is driven through shaft 59 of the main drive and the universal connection 60 which has its forward end secured to the rear end of the shaft of roll 73, this latter roll being rotated so that the side thereof opposing the adjoining roll moves downwardly, the other harvester roll 72 is driven in the opposite direction.

Attached to each longitudinal frame bar 17 is a plate 93 (see Figs. 3 and 15) projecting outwardly from the bar 17 toward and overlying the adjacent harvester roll 73 to act as a stripper plate (see Fig. 16), and this plate extends forwardly from a point adjacent the bearing support 23 to a point in advance of the frame bar 17 and overlies an extension 94 at the forward end thereof. Plate 93 has a downwardly turned outer edge projecting toward and overlying the adjacent roll 73 (see Fig. 16). The upper face of the plate at its outer edge is preferably provided with a removable wearing strip for a gathering chain.

A bracket or frame 96 (see Fig. 18) is adjustably mounted on the forward portion of the plate 93 through bolts 97 having an enlarged shank portion 98 adjacent the head of the bolt and passing through a transversely elongated slot 99 in the base of the frame 96, and the reduced lower portion of the bolt passes through and projects downwardly beyond a longitudinally elongated slot 101 through plate 93 and a reinforced portion thereof. A guide collar 102 surrounds the upper end of the reduced shank of the bolt 97 and bears against the underside of the bracket frame 96, the axial length of the collar 102 being such that it projects slightly below the under surface of the reinforced portion of the plate 93. A nut 103 is threaded on the lower end of the bolt and may be drawn up tightly, preferably through the intermediary of a washer extending beyond the sides of the slot 99, against the lower face of the spacing collar 102. The frame 96 may be thus fixed against movement transversely of the plate 93, but at the same time the frame is free to move longitudinally of such plate. On release of the nuts on the bolts 97, the frame may be adjusted transversely of the plate 93.

With the supporting frame 96 fixed in a predetermined position, the frame is yieldingly urged forward along the plate 93 by an abutment nut 104 adjustably held in position on the forward end of a rod 106, the latter passing in guided relation through an aperture in the rear end wall 107 of the frame 96. The rod 106 is yieldingly urged forward by a compression spring 108 held between an adjustable nut 109 and washer associated therewith on the rod and an abutment 111 on a supporting bracket frame 112 and through which the rod passes. An abutment 113 on the rear end of the rod 106 is cooperative with the abutment 111 to limit the forward movement of the rod and the supporting frame 96. The frame 112 is supported in transversely adjustable position on the plate 93 and an upper bracket element on the outer wall of a shield 114, referred to hereinafter, by separate bolts 116 passing through apertures in the latter bracket and the plate 93 and its supporting brackets 117, and through transversely elongated slots 118 in the upper and lower walls of the frame. With the securing nuts or bolts 116 withdrawn from clamping position, the position of the supporting frame 112 may be adjusted laterally with respect to plate 93.

Due to the fact that the rod 106 has only a loose guiding fit in the apertures of the abutment walls 107 and 111, variation of the lateral position of the supporting frame 112 does not affect the action of the rod, urged by spring 108, in yieldingly urging forward the frame 96 independently of the transverse position of either of the supporting frames 96 or 112. A chain sprocket 119 is mounted for free rotation on a bearing sleeve 120 held clamped in position by a bolt 121 passing through apertures in the forward end portion of the upper and lower walls of the frame 96; and due to the action of the spring pressed rod 106 on the frame 96, this sprocket is yieldingly urged to a forward position to maintain in desired taut condition a combined gathering and conveying chain 122 on the sprocket having conveying flights 123 and driven by the sprocket 71 of the power drive near the rear end of the harvester frame. The flights 123 are of reduced height toward their outer ends and the outer portions of the flights lie over the harvesting rolls 72, 73 to a sufficient extent to draw stalks between the snapping rolls and to engage and convey picked ears rearwardly along the rolls. These chain flights preferably extend from the chain in a direction having a slight component in a trailing direction with respect to the travel of the chain, as indicated in Fig. 3.

Chain guides 124 and 125 for the rearwardly traveling working course of the chain 122 are detachably secured to the outer walls of the supporting frames 96 and 112, respectively, for guiding or limiting the lateral movement of this portion of the chain. Through lateral adjustment of the frames 96 and 112, in the manner described hereinabove, the chain guides 124 and 125 may be laterally adjusted to some extent to best provide for the chain satisfactorily handling different crops under different conditions.

The forwardly diverging inner frame bars 17, the parallel outer frame bars 21 and the associated cross frame members 18, 19, 22 and 24 constitute an elongated supporting frame which carries the two pairs of forwardly extending side opposed harvester rolls 72, 73, one pair of these rolls being disposed at the right side of the harvester as shown in the upper part of Fig. 3, and the other pair of rolls 72, 73 being disposed at the left side of the harvester as shown in the lower part of Fig. 3. Also carried by the elongated supporting frame 17 to 24 are right and left trough structures 126, one of which is shown in detail in Figs. 10, 11 and 12. Each of the trough structures 126 is removably secured by bolts, through a vertical flange or wall 127 at its outer side adjacent the rear end thereof to a bracket 128 (see Fig. 3) attached to the forward side of each end of the main drive housing 55, and it is also removably secured by bolts at a forward point to an upper flange or bracket 129 on the bearing support plate 26 (see Fig. 12). The rearward outer side portion of the trough 126 flares inwardly to the bottom of the trough. Each trough 126 has its rear portion resting on the upper side of the drive housing 55, with an inclined discharge lip extending rearwardly and downwardly past the rear edge of the housing 55, as indicated at 130 (see Fig. 10); and it has its forward end secured in position by bolts (not shown) passing through a flange on an underlying bracket connected to the adjacent frame bar 17. Spacers surrounding these bolts maintain the desired spaced relation between the aforesaid underlying bracket and an overlying flange of the adjacent bracket plate 38 (Fig. 3), this spacing corresponding to the height of the inner side wall portion 131 of the trough 126. The forward portion of the outer side wall 127 of the trough 126 is of reduced height, and at its forward end adjacent the bearing support 26 it is distorted inwardly, to form a lip, as indicated at 152 (see Fig. 10) lying over the gears 86, 87 (see Fig. 2) on the rear end of the roll shafts. The mounting of the two troughs 126 on the supporting frame 17 to 24 is such that each trough extends along the frame in material confining relation to the top surfaces of the adjacent pair of harvester rolls 72, 73 and rearwardly therebeyond, the bottom wall portion of the trough between the rearward outer side wall 127 (Fig. 10) and inner side wall 131 providing a rearward extension of the material supporting surfaces afforded by rear ends of the adjacent husking sections 83 and 89.

Longitudinally extending chain guides 133 and 134 for the working course of the chain are secured in position by bolting same to the bottom of the trough 126; and an inner chain guide 136 for the return course of the chain is secured in a like manner on the bottom of the trough. A guide sprocket 137 for the chain is mounted on a bearing sleeve held in position by a bolt, in the same general manner as the front sprocket 119, this bolt passing through and securing the bearing sleeve between the bottom of the trough 126 and a bracket plate 138 mounted in position on the upper face of the adjacent ends of the chain guides 133, 134. The position of the sprocket 137 is such as to properly determine the position of and guide the active course of the chain with respect to the harvesting rolls, so that the flights thereof lie in suitable position over the rolls.

A supporting bracket 139 is mounted on the upper side of the forward end of plate 93, as more particularly indicated in Fig. 7, this bracket carrying a suitably braced and vertically offset flange portion 140 on the upper face of which a circumferentially toothed gathering spider 141 of dished formation and having a central hub portion 142 rotatably mounted on a bearing sleeve held in adjustable position by a bolt passing through the bearing sleeve and through a longitudinally elongated slot in the flange portion 140 of the bracket. The bracket itself is preferably held in laterally adjustable position by bolts passing downwardly through an aperture in the bracket and through transversely elongated slots 143 (see Fig. 15) on the forward end of plate 93, the bolts being held in position by nuts at the lower side of the plate. The dished spider 141 presents an upwardly facing concave side and its axis is inclined both forwardly and outwardly at a slight angle, preferably about fifteen degrees, to the vertical, so that the lowermost portion of the tips of the teeth of the spider are at the forward inner side thereof, in a position immediately adjacent the ground so that they may rake the surface of the ground and lift down stalks and ears during operation of the machine.

Forwardly extending frame bars 144 (see Fig. 2) are pivotally mounted on a horizontal axis on a pivot carried by bearing 145 (Fig. 15) at the front end of the forward extension 94 of the frame bars 17; and the forward portion of these bars 144 gradually curve inwardly. Upstanding side shield elements 146 (Figs. 1 and 3) of gradually reduced height toward their forward end are secured to the bars 144, with the bars extending beyond the forward end of the shields; and the rear end of these shields fit outside the forward end of inner gathering shields 114 (Figs. 1 and 3); the pivotal movement of the bars 144 and shield element 146 carried thereby being limited through engagement of inwardly extending bolts 148 (see Fig. 1) at the upper rear end of the shields 146 passing through elongated slots in the forward end of each gathering shield 114.

Each gathering shield 114 is mounted in position at its forward end by bolts 116 passing through an inner flange bracket on the outer wall of the shield and through the bracket frame 112, as indicated in Fig. 18. The upwardly rising outer wall of each shield 114 is turned inwardly to provide an approximately horizontal edge portion which is secured to a flange on the upstanding bracket plate 38 (see Fig. 3). The lower substantially vertical side wall of the shield 114 preferably has a rearward extension 149, the rear end being inclined inwardly, and this vertical wall being secured to the upper face of the chain guides 133, 134, preferably by the same bolts as are used to secure the chain guides in position on the trough 126 (see Fig. 12).

Mounted on the front end of the tractor frame (see Fig. 1) is the upper section 150 of a center divider, this section comprising a forwardly extending roof section 151 and a downward projection 152 therefrom having an inclined and generally curved forward wall with side portions extending alongside and spaced from the front end of the tractor frame. This upper section is detachably secured to tractor frame members 2 by means of brackets 153.

A lower center divider section 154 has its upper edge of generally rounded form, fitting over the corresponding shaped lower edge portion of the upper section 152 of the center divider and has rearwardly extending side portions through which this lower section is pivotally mounted in a detachable manner to a lower rear edge portion of the upper section of the divider, preferably through a removable pivot bolt passing through suitably stiffened portions of the side walls of the two sections. The lower forward edge of section 154 is provided with reinforced side strips each provided with a bail or loop into which the forward ends of pivoted arms on the side shield 146 project with a loose guided fit, thus assisting in bracing the lower edge portion of this center divider section 154, while at the same time permitting pivotal movement of this divider section and the shield 146, and insuring that the divider section may follow the raising and lowering of the forward end of the harvester frame to which the shields 146 are pivotally attached.

An inner rear shield section 155 is secured in position (see Fig. 3) by bolts, preferably the same bolts as hold the chain guide 136 in position. The upwardly and outwardly rising wall at the forward portion of the shield is secured by bolts on the rearwardly extending guide wall section 149 of the shield 114; and the rear portion of shield 155 of gradually reducing height has its upper edge in engagement with the inner side of the rear portion of the guide wall extension 149.

A rear end shield or guard 156 (Fig. 3), overlying the upwardly extending driving shafts 68 of the main power drive on which the sprockets 71 are mounted, has forwardly extending side walls inside which the rear ends of the rear extensions 149 of the shield 114 fit and which are preferably bolted to such extensions, preferably in a manner to provide longitudinal adjustment of the fixed connection between the parts.

A separate forwardly extending frame bar 157 is detachably bolted to the outer side of the forward end of each frame bar 21, this bar 157 extending forwardly in substantially the same plane as frame bar 21 and the adjacent portion of frame bar 17; and it has an extension 158 secured to the bar at its forward end (see Figs. 3 and 15).

A transversely adjustable stripper plate 159, inclined downwardly so that its inner edge lies over and adjacent harvester roll 72, is mounted on upper flange portions of brackets 160 secured to the frame bar 157 (see Fig. 17), bolts 161 passing through transversely elongated slots 162 in the stripper plate and apertures in the flange of brackets 160 secured to the bar 157. These bolts 161 preferably have spacer collars thereon lying in the transverse slots 162 of the stripper plate, a nut on the upper end of each bolt being turned down against the spacing collar so as to secure the collar in fixed position as a guide along which the slotted portion of the stripper plate may move transversely across the brackets 160. This stripper plate is held in any desired position of adjustment with respect to the bar 157 by means of hand bolts 163 each threaded through a projection 164 at the lower side of bracket 160 and passing through an aperture in an outer flange 165 of the stripper plate and held against movement relative to the latter by a flange or enlargement on the bolt bearing against the outer face of the flange 165 and a nut 166, the latter being held in position by a lock nut, and the bolt bearing against the inner face of the latter flange. As the bolts are rotated, they withdraw from or enter the projecting lugs 164 on the brackets to cause the stripper plate 159 to be shifted laterally inward or outward to the desired extent with respect to the adjacent picker section of the harvester roll.

Forwardly of the stripper plate 159 is a second stripper element 167 mounted on the frame bar 157 and the forward extension 158 thereof, by bolts 168 passing through apertures in the frame bars 157 and through transversely elongated slots 169 in the stripper element 167.

The inner edge of the stripper plate 167 is in the form of pivoted stripper sections or leaves 170, 171 having hub sections 172 at their remote ends and hub section 173 at their adjacent ends, and through which a pivot spindle 174 passes, this spindle likewise passing through apertures in hinge brackets 175 and an intermediate hinge bracket 176 secured in position at the inner edge of the body portion of the plate 167. The intermediate hinge bracket 176 has an upstanding projection flanged over at its upper end, as indicated at 177 (see Fig. 16), this flange having at its inner edge a downwardly inclined projection 178, projections 179 on the adjacent hub portions 173 of the pivoted stripper leaves 170, 171 being engageable with the underside of the stop 178 to limit the downward movement of the stripper leaves. Torsion springs 180 surround portions of the pivot spindle 174 between the hub portions 172, 173 of each stripper leaf; and one end of the springs bears against the adjacent inner edge of the upper portion of the stripper element 167 and the other end of the springs bears against the outer edge of the adjacent stripper leaf. A guard plate 181 overlying the hinge brackets may be secured in place on the upper face of the flange 177. Through this arrangement, the springs bias the leaves in a counterclockwise direction as reviewed in Fig. 16, wherein further downward movement of the leaves is restrained by engagement of the projection 179 on the leaves with stop 178. In operation, the stripper leaves may be rotated on their pivot, so as to raise the inner edges of the leaves, by a low hanging ear or a heavy stalk beneath the leaves, to permit an ear to pass upwardly of the inner edges of the leaves, thus insuring that the ear of corn and the portion of stalk to which it is attached are brought to the upper side of the stripper plates into a position where the ear may be subjected to the normal action of the snapping roll sections.

A forwardly extending bracket 182 (see Figs. 8 and 9) is pivotally mounted through a base flange 183 and an upper bracket portion 184 thereof, on a bearing sleeve 185 clamped in position between the upper face of the stripper element 167 and the lower face of the bracket 184, by the most forward bolt 168 passing through an aperture in the forward end of the bar 157 and a transversely elongated slot 169 in the stripper element 167, a securing nut on the upper end of the bolt holding the parts in position. The pivoted bracket 182 is biased inwardly about its pivot by a spring 186 bearing against the outer face of a vertical web of the bracket and is held in position thereagainst under adjustable compression by a nut on the outer end of a bolt 187 passing through the web of the bracket 182 and a vertical flange of a bracket 188 adjustably secured to the inner edge of the stripper element 167 and the extension 158 by a bolt 189 which passes through a transversely elongated slot in the bracket 188. Through this connection, the bracket 188, against which the head of bolt 189 bears, may be adjusted laterally to vary the normal biased condition of spring 186 and position the bracket 182.

At the forward end of bracket 182 (see Fig. 14) a vertically offset flange portion 190 is provided, this flange portion being turned laterally inward. A bearing sleeve is held in adjustable position between the upper face of the offset flange portion 190 and a securing nut on the upper end of the holding bolt 191, the bolt passing through a longitudinally elongated slot 192 (see Fig. 8) in the flange 190. The hub 193 of a circumferentially toothed dished gathering spider 194 is mounted for free rotation and against axial movement on the bearing sleeve. The gathering disk or spider 194, like the gathering spider 141, presents an upwardly facing concave side as best shown in Fig. 14, and its axis of rotation is inclined forwardly and inwardly to a slight extent from the vertical, preferably about fifteen degrees in each direction, so that the teeth of the spider at a point forwardly and inwardly of the pivotal axis constitute the lowest point of the disk, that is, the position closest to the ground. The position of the pivot of the spider 194 is preferably such that in operation the tooth tips of the spider 194 pass along in substantial contact with the teeth on the gathering spider 141 mounted at the forward end of stripper plate 93. It will be noted that the bracket 139 (Fig. 7) affords a bearing structure which is operatively associated with one of the gathering spiders, that is with the gathering spider 141, and that the longitudinal bar 17 affords an inner side portion of the harvester frame to which the bracket or bearing structure 182 is secured by means of the stripper plate 93 so as to mount said one gathering spider (141) for rotation on a generally upwardly extending axis in a forwardly and outwardly inclined position as indicated in Figs. 3 and 7. Similarly, the bracket 182 (Figs. 8, 9 and 14) affords another bearing structure which is operatively associated with the other of the gathering spiders, that is with the gathering spider 194, and the longitudinal bar 157 affords an outer side portion of the harvester frame to which the bracket or bearing structure 182 is secured by means of the stripper plate 167 so as to mount the other gathering spider 194 for rotation on a generally upwardly extending axis in a forwardly and inwardly inclined position. The mechanism comprising the gathering spiders 141 and 194 and their respective mounting structures functions to pick up fallen ears from the ground ahead of the harvester rolls 72 and 73 and to convey said ears rearwardly and upwardly, and to deposit them on the forward portions of the stripper plates 93 and 167. A rearwardly directed shield 195 (see Fig. 9) may be attached in position through the bolt 189 securing the bracket plate 188, or one or more bolts, to the underside of the extension 158, the rear open end of this shield guarding the forward point of the adjacent harvester roll 72.

An outer gathering shield 196 is (see Fig. 15) attached in position through a flange at the inner lower edge thereof, to the stripper plate 159, through the bolts 161 which mount the stripper plate on the brackets 160 of bar 157, the shield extending upwardly and curving outwardly to a vertical outer side wall portion, generally as indicated in Fig. 3. The upper portion of this gathering shield may be braced in position by one or more bracing rods secured thereto and to the outer edge of the stripper plate 159, and the lower forward edge of the gathering shield may be suitably stiffened and held in position by one or more braces or plates detachably secured to such lower edge portion and to the outer edges of the stripper plate, as shown in Fig. 14.

A supporting hub or sleeve 197 (see Fig. 3) is mounted on the forward end of the extension 158 of the frame bar 157 and a bracket secured to the bar 157. A rod 198 is pivotally mounted in the hub 197 and carries a forwardly extending channel-like frame 199 of gradually tapering width toward its forward end, and a traveling shoe point 200 mounted on the forward end of the channel frame 199. A shield 201 of tapering width and generally semi-circular cross section is mounted on the shoe 200 and the inner edge of the channel frame 199. This gathering shield may be suitably stiffened along its lower outer edge. The shield 201 may rise and fall to a limited extent about the pivot rod 198, with the rear end of the shield riding over and along the forward end portion of the shield 196, the upward movement of the shield 201 being limited by a binding engagement between the rear end of such shield and the adjacent portion of the gathering shield 196.

An auxiliary shield 202 (see Fig. 14) in the form of a dished plate, is attached in position within the lower inner portion of the gathering shield 196 by one or more brackets attached thereto, and serves as a special shield for the body portion of the gathering disk or spider 194.

A rearwardly extending substantially vertical guide plate or wall 203 (see Fig. 3) is attached to the lower rear part of the inner side wall of the gathering shield 196, this guide wall extending rearwardly, with its rear end bent inwardly, to the forward edge of the outer guide wall 127 of the trough 126, and an extension or rod 204 fits into a bail or slotted part 205 carried at the outer side of the wall 127. With this arrangement the rear end of the guide wall 203 is definitely positioned with respect to the trough and forms, in conjunction with wall 127, the outer side of a conveyer trough through which the active course of the chain 122 passes, the inner wall of this conveyer trough being formed by the rear extension 149 and the chain guides 133, 134 on which the extension 149 is mounted (see Figs. 1, 3 and 10).

A transversely extending hollow bracket portion 206 (see Fig. 3) is secured to and supported by the upper portion of the inner side wall of the gathering shield 196 and is provided with a depending forward wall, this bracket forming a bracing connection between the outer shield 196 and the adjacent portion of the inside gathering shield 114. The inner edge of the bracing bracket portion 206 is provided with a securing bracket or extension 207 at its underside fitting beneath a securing clip 208 attached to the vertical bracket plate 38, bracket 207 having rearwardly opening slots which fit about the shank portions of bolts 209 passing through the clip 208. Securing nuts are drawn up tight against the clip 208 to secure the inner edge of the transverse bracket portion 206 of the outer gathering shield 196 in position.

An ear pressing or retarding plate 210 has a pivot pin 211 secured to its forward end and pivotally mounted in brackets 212 secured to the upper edge of the extension wall 203 and to the upper edge of the side wall extension 149 of the inner shield 114. The outer end of the pivot pin is bent down at right angles, as indicated at 213 (see Figs. 5 and 6) beyond the outer side wall of the extension 203. The retarding plate 210 extends rearwardly and downwardly at an angle of approximately 45 degrees from its pivot and its rearward end 214 lies substantially horizontal under normal conditions. The rearwardly inclined portion has downwardly extending bracing ribs or flanges 215 at its side edges, and the rearward portion has its side edges flanged upwardly and outwardly, as indicated at 216, these latter flanges being of reduced height and width toward the rear and merging into the side edges of the inclined portion of the plate.

The retarding plate lies over the husking sections of the harvester rolls and presses downwardly upon the ears of corn carried along by the chain and forces them into such intimate contact with the husking roll sections as to insure that the rolls, particularly through the action of the husking pegs thereof, will seize the husks and start the latter through the rolls, to thereby remove the husks.

The retarding plate is yieldingly urged downward by a tension spring 217 secured in an adjustable manner at one end to a bracket 218 attached in adjustable position to the extension wall 203 of the gathering shield 196, and at the other end to the downwardly projecting portion 213 of the pivot rod. The portion 213 of the pivot rod 211 forms a movable stop element which bears against a fixed stop element afforded by the rearward edge of the bracket 218 to limit the downward movement of the retarding plate about its pivot to such a degree as to permit the plate to yieldingly press ears of different sizes against the rolls, while at the same time not interfering with the passage of the flights 123 of the conveyer chain.

The side walls of the ear elevating conveyer 16 are selectively longitudinally aligned with side walls 127 by means of projections 219 fitting into bails formed on the sides of 127. The lower portion of conveyer 16 is detachably supported on brackets 222 or frame members 17 and the upper portion of conveyer 16 is detachably connected to the tractor by means of rods 220. Endless conveyer 221, operatively connected to gear 61 is supported in conveyer 16. The side walls of conveyer 16 form a hopper for directing ears of corn from the rear end of the rolls 72, 73 into contact with endless conveyer 221 which elevates ears to a point of discharge or collection.

With the corn harvester, including the elevating conveyer, mounted on the tractor, the harvester is fairly well balanced about its pivots 27, with allowance for the necessary excess weight at the forward end to insure downward bias thereof; and a complete picker-husker unit is carried at each side and below the front portion of reduced width of the tractor, with the forward portion of the harvester rolls laterally outside of the front tractor wheels and the harvester rolls laterally within the tread of the rear tractor wheels, and the stripper plates, the gathering spiders and the forward chain guides suitably adjusted for the general condition of the crop. The central divider and the front wheels of the tractor travel between two adjacent rows of corn, and the tractor wheels travel outside of these rows. If the stalks are in a generally down condition, the forward end of the harvester frame is tilted down so that the forward traveling shoes on the central divider and the outer gathering shields ride along or adjacent the ground and, through action of the center divider and the forward gathering shields, supplemented by gathering spiders 141 and 194, broken and down stalks are lifted toward the vertical position, and fallen ears are lifted. As the stalks come under the influence of the gathering chain, they move along above the stripper element 93 and the forward hinged leaves 170, 171 of the stripper element 167, these leaves yielding sufficiently to permit any low hanging ears to ride upwardly to the upper side of the stripper plates. As the stalks move along the snapping sections of the rolls, the forward bearing of the outer roll 72 yields sufficiently to accommodate the stalks between the rolls, until the rear portion of the snapping section snaps off the ears, the latter remaining always above the stripper plates, so that the kernels adjacent the butts of the ears cannot be drawn into or pinched by the rolls.

The relatively rearward movement of the upper part of the stalks along the rolls is limited by the stalks engaging the bearing housing 23 and the forward wall of the inwardly projecting brace extension 206 of the outer gathering shields. The picked ears are conveyed by the flights of the chain 122 over and in contact with the husking roll sections, the yielding presser plate 210 insuring sufficiently forcible contact of the ears with the rolls to enable the husking rolls to seize and peel off the husks, carrying the latter downwardly through the rolls. The formation of the presser plates and the flights 123 of the conveying chain are such that the presser plate accomplishes its desired function without interference with the chain. The conveying chain carries the husked ears from the husking section, over the guard lip 152 of the trough 126 and onto and along the bottom wall of the trough from the rear end of which the ears drop into the well at the forward end of the elevating conveyer 16, from whence the ears are carried upwardly and rearwardly and discharged into a trailing wagon.

It should be understood that this invention is not limited to the particular details of construction and design shown and that the invention includes such other applications and modifications as are fairly included within the scope of the annexed claims.

It is claimed and desired to secure by Letters Patent:

1. In a corn harvester, a supporting frame carrying a pair of forwardly and downwardly inclined cooperative harvester rolls, each of said rolls comprising a husking section, a conveying chain carried by said frame at the inner side of one of said rolls with the flights of the active course of said chain passing along and over said rolls and rearwardly beyond the latter, said chain being operative to convey picked ears rearwardly and upwardly over said husking rolls and to convey husked ears rearwardly from said husking rolls to a rear collection point, a presser plate pivotally mounted at a forward end portion thereof for up and down swinging movement about a transverse axis overlying said rolls and chain, means for biasing said presser plate to engage and yieldingly urge picked ears against said rolls, a movable stop element associated with said presser plate, and a fixed stop element associated with said frame in coacting relation with said movable stop element so as to limit the downward movement of said plate and thereby prevent said plate from interfering with the movement of said chain.

2. In a corn harvester, a supporting frame, a pair of forwardly extending cooperative harvester rolls mounted on said supporting frame with the outer roll at a slightly higher lever than the inner roll, each of said rolls comprising a forward picker section, stripper plates mounted on said frame and each overlying the adjacent roll, means mounted on said supporting frame for laterally adjusting one of said stripper plates, the adjacent edges of said stripper plates being spaced apart a distance less than the diameter of an ear of corn, the inner edge of the forward portion of one of said stripper plates being in the form of a pivotally mounted stripper leaf, spring means mounted on said supporting frame for biasing said leaf to normal operative position and permitting yielding upward movement of the inner edge of said leaf, and stop means mounted on said supporting frame for limiting the movement of said leaf in the direction of its bias.

3. In a corn harvester, a supporting frame, a pair of forwardly extending cooperative harvester rolls mounted on said frame, a gathering and conveying mechanism operatively mounted on said frame, said mechanism including a chain having flights traveling rearwardly along said rolls, a front sprocket for said chain, an adjustable support rotatably mounting said front sprocket and operatively connected with said frame for limited free longitudinal movement and lateral adjustment of said adjustable support to any one of a plurality of fixed positions, biasing means operatively associated with said front sprocket support for urging said support forwardly independently of its position of lateral adjustment, and a guide for the active course of said chain carried by said sprocket support and laterally adjustable therewith.

4. In a corn harvester, a supporting frame, a pair of forwardly extending cooperative harvester rolls mounted on said frame, a gathering and conveying mechanism operatively mounted on said frame, said mechanism including a chain having flights traveling rearwardly over said rolls, a front sprocket for said chain, an adjustable support rotatably mounting said front sprocket and operatively connected with said frame for limited free longitudinal movement and lateral adjustment of said adjustable support to any one of a plurality of fixed positions, a supporting bracket mounted on said frame and adjustable laterally thereon to any one of a plurality of fixed positions, and resilient means carried by said supporting bracket for yieldingly urging said adjustable support to a forward position independently of the position of lateral adjustment of said supporting bracket or said adjustable support, and guides for the active course of said chain carried by said adjustable support and said supporting bracket and laterally adjustable therewith.

5. In a corn harvester, a supporting frame having laterally spaced inner and outer side portions; a pair of forwardly extending cooperative harvester rolls carried by said frame and each having a forward picker section; stripper plates mounted on said frame adjacent to and overlying said rolls and having stripping edges, respectively, spaced from each other a distance less than the diameter of an ear of corn; and a mechanism for picking up fallen ears from the ground ahead of said harvester rolls and for conveying said ears rearwardly and upwardly and depositing them on the forward portion of said stripper plates, said ear pickup mechanism comprising a pair of circumferentially toothed gathering spiders, a bearing structure operatively associated with one of said spiders and secured to said inner side portion of said supporting frame so as to mount said one spider for rotation on a generally upwardly extending axis in a forwardly and outwardly inclined position, and another bearing structure operatively associated with the other of said gathering spiders and secured to said outer side portion of said supporting frame so as to mount said other spider for rotation on a generally upwardly extending axis in a forwardly and inwardly inclined position, said spiders being dished so as to present upwardly facing concave sides, respectively.

References Cited in the file of this patent

UNITED STATES PATENTS

| Number | Name | Date |
|---|---|---|
| 311,056 | Avery et al. | Jan. 20, 1885 |
| 397,998 | Osborne | Feb. 19, 1889 |
| 461,246 | Meader | Oct. 13, 1891 |
| 799,845 | Goodhue | Sept. 19, 1905 |
| 843,866 | Bursell | Feb. 12, 1907 |
| 864,227 | Brass | Aug. 27, 1907 |
| 1,155,827 | Liebl | Oct. 5, 1915 |
| 1,373,428 | Hughes | Apr. 5, 1921 |
| 1,706,823 | Rosenthal | Mar. 26, 1929 |
| 1,793,692 | Groves | Feb. 24, 1931 |
| 1,853,176 | Paradise et al. | Apr. 12, 1932 |
| 1,940,851 | Everett et al. | Dec. 26, 1933 |
| 2,004,720 | Coultas et al. | June 11, 1935 |
| 2,169,070 | Kuhlman | Aug. 8, 1939 |
| 2,180,594 | Kuhlman | Nov. 21, 1939 |
| 2,210,341 | Rund, Jr. | Aug. 6, 1940 |
| 2,288,915 | Morral et al. | July 7, 1942 |
| 2,293,757 | Jochumsen | Aug. 25, 1942 |